(12) United States Patent
Brandenstein et al.

(10) Patent No.: US 6,193,417 B1
(45) Date of Patent: Feb. 27, 2001

(54) BELT TENSIONER DEVICE AND METHOD FOR MAKING SAME

(75) Inventors: Manfred Brandenstein, Eussenheim; Wolfgang Friedrich, Schweinfurt; Roland Haas, Hofheim; Roland Harich, Höchheim; Gerhard Herrmann, Schweinfurt; Bruno Schemmel, Geldersheim; Josef Stork, Gerolzhofen, all of (DE)

(73) Assignee: SKF GmbH (DE)

( * ) Notice: Subject to any disclaimer, the term of this patent is extended or adjusted under 35 U.S.C. 154(b) by 0 days.

(21) Appl. No.: 09/007,449

(22) Filed: Jan. 15, 1998

(30) Foreign Application Priority Data

Jan. 15, 1997 (DE) .............................. 197 01 087

(51) Int. Cl.$^7$ ............................................... F16C 19/50
(52) U.S. Cl. .............................................. 384/447
(58) Field of Search ................... 384/447, 535, 384/536, 537, 276, 255, 256; 264/262; 29/898.056

(56) References Cited

U.S. PATENT DOCUMENTS

| 1,794,184 | * | 2/1931 | Leis ................................. 29/898.056 |
| 1,809,838 | * | 6/1931 | Fiegel et al. ..................... 29/898.056 |
| 2,674,782 | * | 4/1954 | Surtees ............................ 29/898.056 |
| 3,608,049 | * | 9/1971 | Tavella ............................ 264/262 X |
| 3,897,988 | * | 8/1975 | Dickinson et al. ............. 384/537 X |
| 5,216,811 | * | 6/1993 | Jackson et al. .................. 384/276 X |
| 5,295,744 | * | 3/1994 | Petrezelka et al. ............... 384/536 |
| 5,314,255 | * | 5/1994 | Schwerdt ........................... 384/536 |
| 5,362,158 | * | 11/1994 | Hashimoto et al. ............. 384/447 |
| 5,501,531 | * | 3/1996 | Hamaekers ....................... 384/536 |
| 5,632,560 | * | 5/1997 | Dittenhofer ....................... 384/447 |

FOREIGN PATENT DOCUMENTS 4209914    3/1992 (DE) .

* cited by examiner

Primary Examiner—Lenard A. Footland
Assistant Examiner—Colby Hansen
(74) Attorney, Agent, or Firm—Eugene E. Renz, Jr., PC

(57) ABSTRACT

A method for forming a clamping device comprising of a swiveling body made of plastic, a plain bearing bushing mounted radially inside the plastic swiveling body, a rolling bearing for mounting a clamping roll arranged eccentrically to the bearing bushing, the edges of the plain bearing bushing being wound out of a strip, and joined to each other under intrinsic tension in the area of the butt joint; and, wherein, the lateral surface of the plain bearing bushing and the bore surface of the rolling bearing function as parts of a mold for the injection-molding of the swiveling body and consisting of the steps of placing the rolling bearing assembly and a plain bearing bushing in a mold half in eccentric relation to one another, placing a second mold half over the plain bearing bushing and rolling bearing configured to form ring-shaped projections to hold rolling bearing in a predetermined axial position relating to the bearing bushing, and injecting a plastic material with the mold closed to form the swivel body.

4 Claims, 2 Drawing Sheets

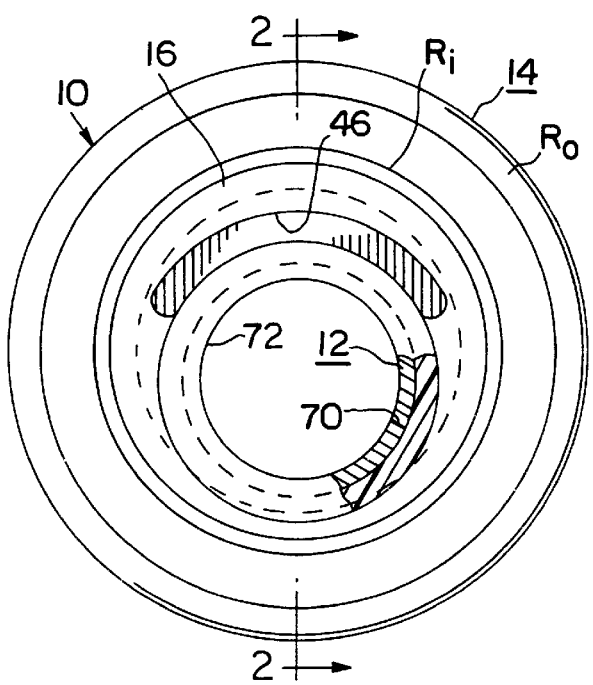
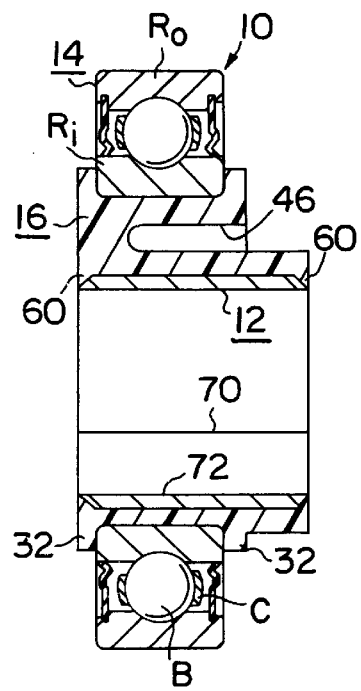
FIG. 1  FIG. 2
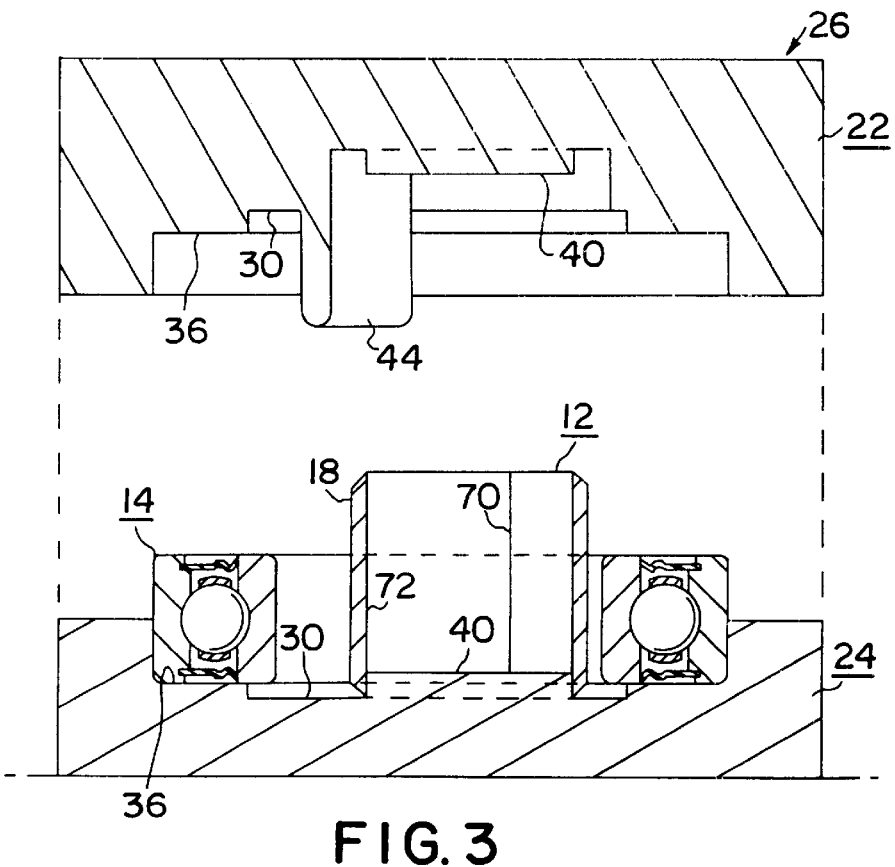
FIG. 3

BELT TENSIONER DEVICE AND METHOD FOR MAKING SAME

BACKGROUND OF THE INVENTION

German Patent DE 4,209,914 is of interest. There is shown in this German patent an assembly including a swiveling body having a plain bearing bushing and a ball bearing for the clamping roll mounted on the lateral surface of the swiveling body. In instances where the swiveling body is made of plastic, the mounting of the bearing is usually not sufficient to survive the required service time without damage. Further, it is required to fix the bearing in place axially on both sides. This requires an additional work step as well as fastening parts are required. The same is also true for the sliding bushing, which is not described in detail.

With the foregoing in mind, it is an object of the present invention to improve the clamping device described above in such a way that it can be produced very simply. Further, the device is characterized by novel features of construction and arrangement so that the bearing can be permanently held in place axially in the plain bearing bushing or sleeve. To this end, in accordance with the present invention, the edges of the bearing bushing or sleeve which is wound out of a strip are joined to each other in the area of the butt joint under intrinsic tension. In accordance with the present invention, the lateral surface of the bearing bushing and the bore surface of the rolling bearing function as parts of a mold for forming the swiveling body by an injection-molding process.

The present invention provides several advantages over the prior art. For example, since the rolling bearing and the plain bearing and the bearing bushing function as part of the mold used to injection-mold the swiveling body, production is a single-step process apart from fabrication of the rolling bearing and the bearing bushing. Further, these two components can be fixed axially in place simply by appropriate positive-locking elements, which are formed simultaneously during the injection-molding process. The bearing bushing is made at low cost by winding and is dimensionally stable even under the action of temperature changes and the force acting on it during the injection process. The edges, which are free in the circumferential direction, lie under pretension on one another so that the liquid injection material cannot intrude between them. As a consequence of this feature, the sliding bushing retains its precise dimensions even after fabrication.

BRIEF DESCRIPTION OF THE DRAWING

These and other objects of the present invention and various features and details of the operation and construction thereof are hereinafter more fully set forth with reference to the accompanying drawings, wherein:

FIG. 1 is an elevational view of a clamping, rolling bearing assembly showing an integrally formed outer ball bearing having the usual inner and outer rings and a plurality of balls in the annular space between the rings eccentrically mounted on a sleeve bearing in accordance with the present invention;

FIG. 2 is a sectional view taken on lines 2, 2 of FIG. 1 showing details of the clamping the roll bearing assembly as shown in FIG. 1;

FIG. 3 is a schematic sectional, elevational view illustrating the first step in forming the integrated ball and sleeve bearing assembly shown in FIGS. 1 and 2;

DETAILED DESCRIPTION OF THE PREFERRED EMBODIMENT

Figure 4:
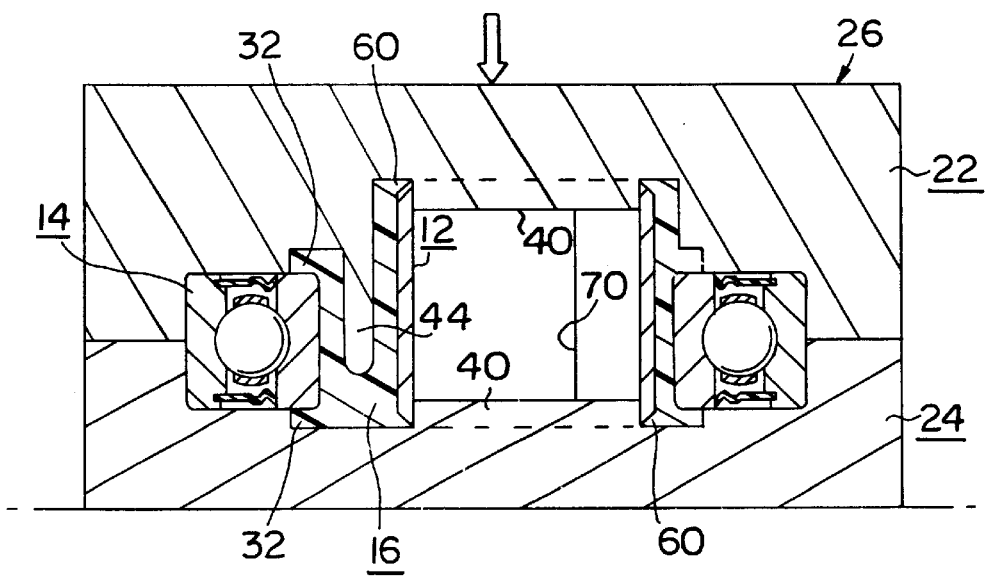
FIG. 4 is a view similar to FIG. 3 but showing the dies closed and the injected plastic material filling the voids between the inner ring of the ball bearing and the outer surface of the sleeve bearing.
Figure 5:
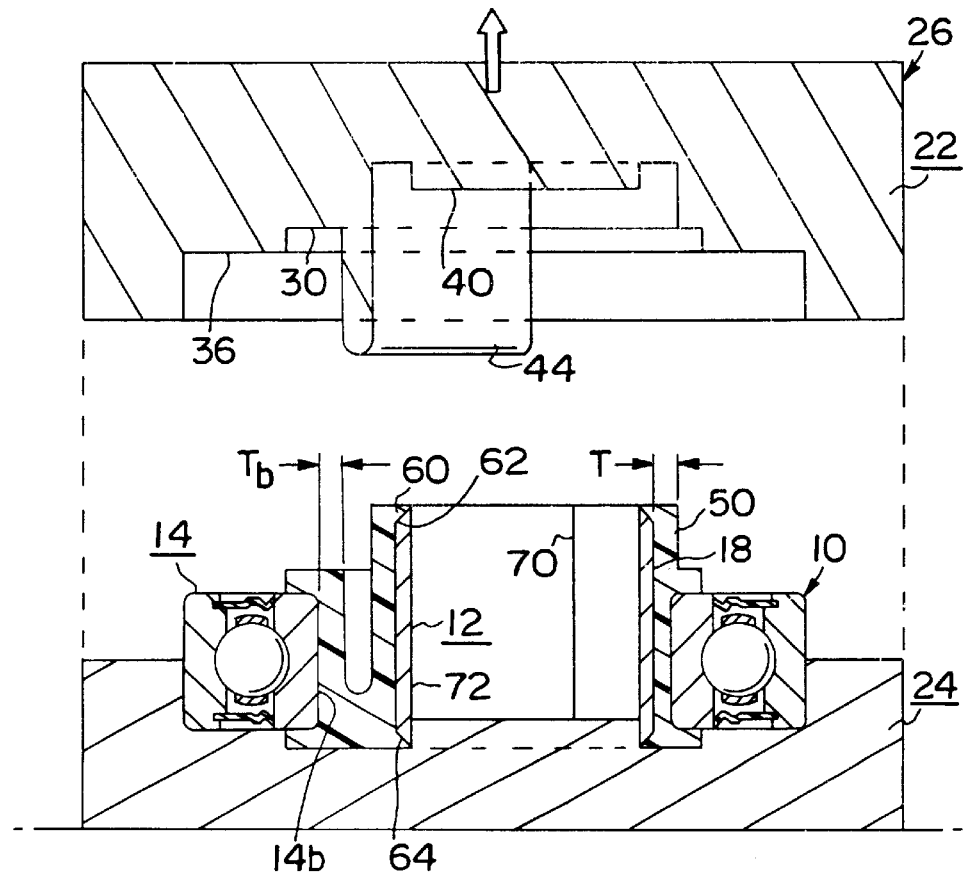
FIG. 5 is a view similar to FIGS. 3 and 4 but showing the dies opened and a completed, clamping roll bearing assembly as the type shown in FIGS. 1 and 2, prior to removal from the die.

Referring now to the drawings and particularly FIG. 2 thereof, there is shown a clamping assembly in accordance with the present invention generally designated by the numeral 10 which broadly comprises a plain bearing bushing 12 and a rolling bearing assembly 14. In the present instance, the rolling bearing assembly 14 is a single row ball bearing comprising the usual inner and outer rings Ri and Ro, a plurality of balls B in the annular space between the rings and a cage C for spacing and guiding the balls. Additional elements of the clamping assembly such as support elements, tensionings springs, separate roll jackets, etcetera are as shown generally in the German Patent DE 4,209,914. The rolling bearing 14 as illustrated in FIG. 2 is eccentrically mounted relative to the bearing bushing 12 on a swivel body 16 in the present instance made of a plastic material.

In accordance with the present invention, the swivel body 16 is formed by an injection molding process wherein the lateral surface 18 of the bearing bushing 12 and the bore surface of the rolling bearing 14 function as mold parts in the manner illustrated in FIG. 3. Further, there is also shown in FIG. 3 the two-half shells 22 and 24 of a mold 26 in the open state. The mold halves have a configuration to support the rolling bearing and bushing in the desired eccentric relationship. The mold halves 22 and 24 are also configured to define the particular configuration of the swivel body 16. Thus, the half shells 22 and 24 are provided with appropriate recesses 30 for forming ring-shaped projections 32 which hold rolling bearing 14 axially in position. Additionally, the half shells 22 and 24 also include cover surfaces 36 to protect the bearing space and a centering projection 40 to support the bearing bushing 12.

The mold 22 also includes a crescent-shaped projection 44 which forms a corresponding recess 46 in the swivel body 16. In the preferred embodiment of the invention, the thickness T of the wall 50 left behind on lateral surface 18 of bearing bushing 12 is preferably the same thickness as the Th left behind on bore surface 14b on rolling bearing 14.

Bearing bushing 12 is also held in place axially by ring-shaped retaining projections 60 having boundary surfaces 62 extending conically outwardly as at 64. The bushing 12 is formed of an elongated strip so that the edges of the strip in the area of the butt joint 70 rest against each other with a predetermined pretension. The bore surface 72 of bearing bushing 12 is designed as a sliding-contact surface.

Even though a particular embodiment of the invention has been illustrated and described herein, it is not intended to limit the invention and changes and modifications may be made therein within the scope of the following claims.

What is claimed is:

1. A clamping device comprising:
    a swiveling body made of plastic;
    a plain bearing bushing mounted radially inside the plastic swiveling body having chamfered external surfaces at opposite axial ends;
    a rolling bearing for mounting a clamping roll arranged eccentrically to the bearing bushing;
    the edges of the plain bearing bushing being wound out of a strip, and joined to each other under intrinsic tension in the area of the butt joint; and, wherein, the lateral surface of the plain bearing bushing and the bore surface of the rolling bearing function as parts of a mold for the injection-molding of the swiveling body, which snugly embraces the chamfered surfaces to fix the bushing axially.

2. A clamping device according to claim 1, characterized in that the bore surface of the plain bearing bushing is designed as a sliding contact surface.

3. A clamping device according to claim 1, characterized in that the swiveling body has ring-shaped projections at the axial ends of the inner ring of the rolling bearing.

4. A clamping device according to claim 1, characterized in that the swiveling body has retaining projections to hold the plain bearing bushing axially in position.

* * * * *